United States Patent [19]

Busboom

[11] Patent Number: 4,751,932
[45] Date of Patent: Jun. 21, 1988

[54] SHOE METERING PANEL

[75] Inventor: Garry W. Busboom, Beatrice, Nebr.

[73] Assignee: Deutz-Allis Corporation, Milwaukee, Wis.

[21] Appl. No.: 78,280

[22] Filed: Jul. 27, 1987

[51] Int. Cl.$^4$ .............................................. A01F 7/00
[52] U.S. Cl. .................. 130/27 AE; 130/24; 130/DIG. 1
[58] Field of Search .............. 130/DIG. 1, 24, 27 AE, 130/27 Z; 56/209; 209/264

[56] References Cited

U.S. PATENT DOCUMENTS 3,092,116  6/1963  Stroburg et al. .............. 130/27 AE
4,677,991  7/1987  Harris et al. .................. 130/27 AE Primary Examiner—Stephen F. Husar
Attorney, Agent, or Firm—Charles L. Schwab

[57] ABSTRACT

An upright metering panel is installed on the cleaning shoe assembly of a combine which has a configuration to distribute the grain being cleaned over a substantial portion of the lateral width of the chaffer part of the shoe assembly.

6 Claims, 2 Drawing Sheets

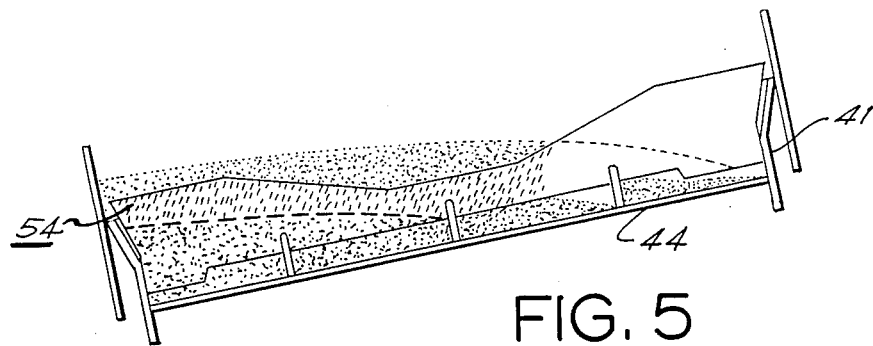
FIG. 5
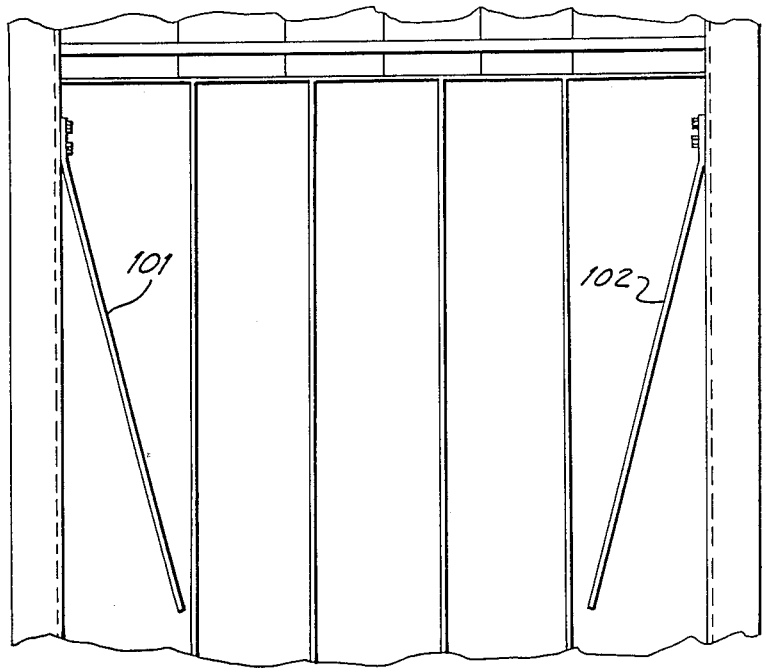
PRIOR ART  FIG. 6
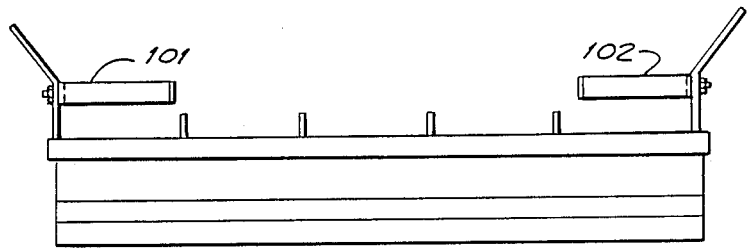
PRIOR ART  FIG. 7

SHOE METERING PANEL

TECHNICAL FIELD

This invention relates to an agricultural harvester with a cleaning shoe assembly having a grain pan and a chaffer and more particularly to adding a distribution mechanism to the shoe assembly to improve distribution of the threshed material on the chaffer when operating on a slope.

PRIOR ART STATEMENT

One prior attempt to achieve better distribution of material on the chaffer of a combine during hillside operation is shown in FIGS. 6 and 7 of the drawings. In such prior art device, a pair of blades are secured at their forward ends to the laterally opposite sides of the chaffer and extend horizontally rearward in converging relation to one another. The blades are positioned just above the level of the top of the chaffer dividers. While these blades have proven to be of some help in distributing material on the chaffer, an even more effective distribution means has been needed for hillside operation.

OBJECTS AND BRIEF DESCRIPTION OF THE INVENTION

It is a general object of this invention to provide an improved means for distributing material on the chaffer of a combine shoe assembly during harvesting on a hillside.

This invention is particularly useful in a combine having a processor section for separating grain from crop material and a cleaning section having a shoe assembly mounted in the combine for a shaking action including a horizontally disposed grain pan for receiving grain from the processor section and a chaffer adjacent to and extending rearwardly of the grain pan for receiving grain from the grain pan. The chaffer is horizontally disposed and presents openings through which the grain passes by gravity. The shoe also has a sieve at a level below the grain pan and chaffer which presents openings through which the grain passes by gravity. The shaking action of the shoe causes the grain to move rearwardly on the grain pan and onto the chaffer. To the foregoing structural combination, this invention adds a vertical metering panel secured to the shoe assembly and extending laterally across the top of the chaffer near its forward end. The panel is spaced above the chaffer and presents a top edge which slopes downwardly to a reduced height at its central part whereby a substantial portion of the grain will pass over the central part of the panel, even though the chaffer slopes laterally during a sidehill operation. The chaffer normally includes longitudinally extending vertical dividers spaced laterally from one another and the panel may include laterally spaced notches extending upwardly from its bottom edge into which the dividers extend. The top edge of the panel at its central part is preferably at about the same level as, or slightly above, the top of the dividers. In the illustrated embodiment, it is slightly above the dividers to provide space for a transverse reinforcing bar. The panel may be vertically adjustable to accommodate different crops and operating conditions and it may be releasably secured to the shoe assembly by releasable fastening means. It is also desirable to provide vertical space between the bottom of the panel and the chaffer to permit grain to pass rearwardly beneath the panel during a harvesting operation.

BRIEF DESCRIPTION OF THE DRAWINGS

One embodiment of the invention is illustrated in the drawings in which:

FIG. 5 is a view similar to FIG. 3 but with the combine harvesting on a sidehill;

FIG. 6 is a partial top view of a prior art shoe assembly; and

FIG. 7 is a rear view of the prior art shoe assembly shown in FIG. 6.

DETAILED DESCRIPTION OF THE DRAWINGS

Figure 1:
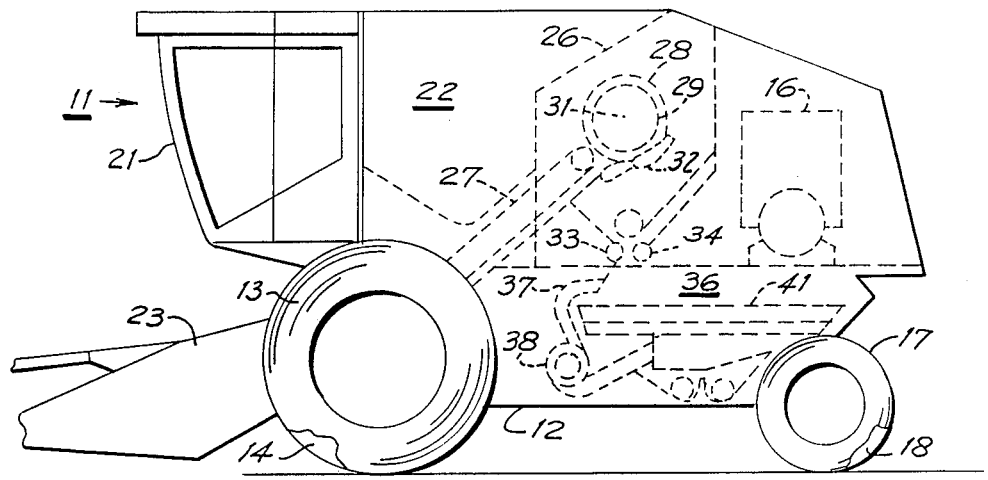
FIG. 1 is a side view of a combine.

The combine 11 shown in FIG. 1 includes a main frame 12 supported by a front pair of drive wheels 13, 14 driven by an engine 16 through a power train, not shown, and a pair of steerable rear wheels 17, 18. An operator's cab 21 is mounted on the main frame 12 in front of a grain bin 22 and above a header 23. Crop material severed by a header 23 is conveyed to an axial flow processor section 26 by conveying means including a conveyor 27. The processor section 26 includes a stationary foraminous cage 28 and a coaxial rotor 29 disposed on a transverse horizontal axis 31. Grain and other small particles of crop material passing through perforations or other radial openings in the cage 28 and a concave 32 fall by gravity to a pair of accelerator rolls 33, 34 which accelerate the grain and other small particles of crop material downwardly to a cleaning section 36 through an airstream directed rearwardly from a duct 37 connected to a transverse blower 38. The cleaning section 36 includes a shoe assembly 41 suspended on the main frame 12 for a shaking movement by conventional means, not shown.

Figure 2:
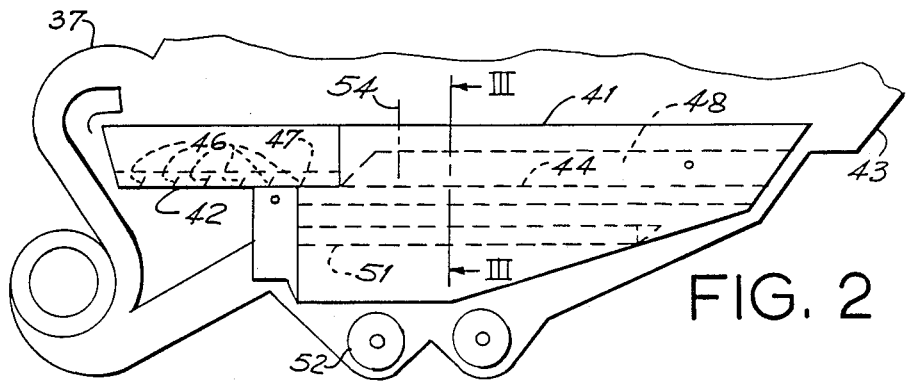
FIG. 2 is an enlarged partial side view of the combine of FIG. 1 with parts broken away to illustrate the cleaning shoe assembly.
Figure 3:
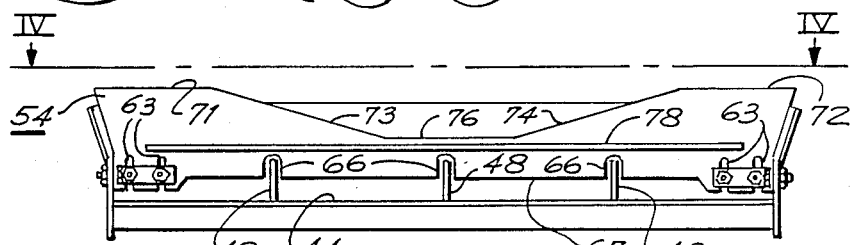
FIG. 3 is a view taken on the line III—III in FIG. 2.
Figure 4:
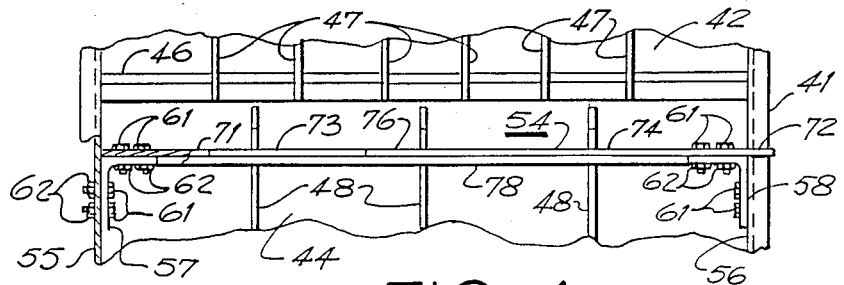
FIG. 4 is a view taken on the line IV—IV in FIG. 3.

Referring to FIGS. 2, 3 and 4, the shaker shoe assembly 41 includes a horizontally disposed grain pan 42 at its front end for receiving grain accelerated downwardly by the accelerator rolls 33, 34. Lightweight chaff and the like is blown rearwardly by the airstream emitted from the duct 37 out a rear opening 43. The shaking action of the shoe assembly 41 causes grain to move rearwardly from the grain pan 42 to a chaffer 44 extending rearwardly from the grain pan. Rearwardly inclined transverse baffles 46 retard rearward movement of the grain on the grain pan and longitudinal dividers 47 help to maintain a lateral distribution. Longitudinally extending vertical dividers 48 are appropriately spaced laterally of one another on the chaffer 44 to help maintain a lateral distribution of material as it moves rearwardly on the chaffer 44. It should be understood that the grain pan has a solid bottom whereas horizontal chaffer 44 and sieve 51 have vertical openings through which grain and other similarly sized particles may fall by gravity and pass to the clean grain auger 52.

When operating on a sidehill, the lateral tilt of the combine will cause grain to accumulate to a greater extent on one lateral side of the shoe assembly from the other. This causes an overloading of grain on that lateral side of the chaffer and the full lateral width of the chaffer is not utilized for cleaning. This reduces the operating capacity of the combine. This invention provides a vertical shoe metering panel 54 which extends laterally across the top of the chaffer 44 and is releasably secured to the shoe assembly side walls 55, 56 by L-shaped brackets 57, 58 and bolts 61 and nuts 62. As seen in FIG. 3, the bolts 61 extend through vertical slots 63 extending upwardly from the bottom edge of the panel 54 near its laterally opposite end portions. This connection not only makes the panel releasable and removable but also allows it to be adjusted vertically to accommodate different crops and operating conditions. The panel 54 also has laterally spaced notches 66 extending upwardly from the bottom edge 67 of the panel 54 into which the chaffer dividers 48 extend. The lower edge of the panel 54 is disposed a predetermined distance above the chaffer 44 to permit rearward movement of a substantial quantity of grain on the chaffer beneath the panel 54.

The top edge of the panel 54 has laterally opposite end portions 71, 72 and sloping intermediate portions 73, 74 which slop downwardly at about 15 degrees from the end portions 71, 72 to a central edge portion 76. The central portion 76 is relatively near the top of the chaffer dividers, however, it is separated vertically therefrom by a transverse panel reinforcing bar 78 welded to the rear side of the panel 54. When operating on a sidehill, the shoe assembly will tilt laterally with the combine and the grain will be deposited on the grain pan and chaffer approximately as shown in FIG. 5. The panel will have a damming effect on movement of grain from the grain pan to the chaffer causing a substantial portion of the grain to flow under the metering panel on the uphill side and to spill over the top edge of the panel. The tapered or sloping portions and the recessed central portion of the panel top edge ensures grain spilling over the central part of the panel and being deposited on a substantial portion of the lateral width of the chaffer. In other words, the panel causes the grain to be deposited on the central and uphill portion of the chaffer. Without the metering panel 54, as much as one-half of the cleaning capacity can be lost during a sidehill operation, whereas by using the metering panel, very little cleaning capacity is lost thereby providing satisfactory harvesting efficiency in most sidehill harvesting situations.

The metering panel 54 is more effective in spreading the grain laterally on the chaffer in a sidehill operation than the blades 101, 102 of the prior art device shown in FIGS. 6 and 7. In the present invention, the panel causes the grain to be deposited toward the uphill side of the chaffer near its front end whereas the prior art blades move the grain uphill on the chaffer at a longitudinally central part thereof, thus failing to make effective use of the cleaning area of the chaffer.

The embodiments of the invention in which an exclusive property or privilege is claimed are defined as follows:

1. In a combine having a processor section for separating grain from crop material and a cleaning section having a shoe assembly mounted in the combine for a shaking action including a horizontally disposed grain pan for receiving grain from the processor section and a chaffer adjacent to and extending rearwardly of said grain pan for receiving grain from the grain pan, said chaffer presenting openings through which grain passes by gravity, said shaking action of said shoe assembly inducing movement of said grain from said grain pan unto said chaffer, the improvement comprising, a vertical metering panel secured to said shoe assembly and extending laterally across the top of said chaffer near its forward end, said panel being spaced above said chaffer and presenting a top edge with intermediate portions sloping downwardly to a reduced height at a central portion thereof whereby when the chaffer slopes laterally due to harvesting on a sidehill, a substantial portion of the grain will pass over the central part of the panel.

2. The combine of claim 1 wherein said chaffer includes longitudinally extending vertical dividers spaced laterally of one another and said panel has laterally spaced notches extending upwardly from its bottom edge into which said dividers extend.

3. The combine of claim 2 wherein the top edge of said panel at its central part is approximately at the same level as the top of said dividers.

4. The combine of claim 1 wherein said panel is releasably secured to said shoe assembly by releasable fastening means permitting removal of said panel.

5. The combine of claim 1 wherein said panel is vertically adjustable relative to said chaffer.

6. The combine of claim 1 wherein the bottom edge of said panel is spaced a sufficient distance above said chaffer to meter the amount of grain to pass rearwardly beneath said panel causing the level of grain in front of the panel (on the grain pan) to rise which distributes the grain across a greater width of the chaffer during a hillside harvesting operation.

* * * * *